(12) United States Patent
Nagai et al.

(10) Patent No.: US 10,974,220 B2
(45) Date of Patent: Apr. 13, 2021

(54) FINE PARTICLE PRODUCING APPARATUS AND FINE PARTICLE PRODUCING METHOD

(71) Applicant: Panasonic Intellectual Property Management Co., Ltd., Osaka (JP)

(72) Inventors: Hisao Nagai, Osaka (JP); Takeshi Koiwasaki, Osaka (JP); Takafumi Okuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 213 days.

(21) Appl. No.: 16/255,135

(22) Filed: Jan. 23, 2019

(65) Prior Publication Data
US 2019/0247822 A1    Aug. 15, 2019

(30) Foreign Application Priority Data

Feb. 9, 2018  (JP) .............................. JP2018-022227
Oct. 16, 2018  (JP) .............................. JP2018-195274

(51) Int. Cl.
*B01J 19/08* (2006.01)
*B22F 9/14* (2006.01)
*B22F 1/00* (2006.01)

(52) U.S. Cl.
CPC .......... *B01J 19/088* (2013.01); *B22F 1/0018* (2013.01); *B22F 1/0048* (2013.01); *B22F 9/14* (2013.01);
(Continued)

(58) Field of Classification Search
None
See application file for complete search history.

(56) References Cited

U.S. PATENT DOCUMENTS

| 5,404,079 A | 4/1995 | Ohkuni et al. |
| 2006/0065516 A1 | 3/2006 | Matsuura et al. |

(Continued)

FOREIGN PATENT DOCUMENTS

| CN | 105810548 | 7/2016 |
| CN | 106693853 | 5/2017 |

(Continued)

OTHER PUBLICATIONS

English Translation of Chinese Search Report dated Nov. 23, 2020 in related Chinese Patent Application No. 201910082964.8.

*Primary Examiner* — Kishor Mayekar
(74) *Attorney, Agent, or Firm* — Wenderoth, Lind & Ponack, L.L.P.

(57) ABSTRACT

A fine particle producing apparatus includes a reaction chamber extending vertically from the lower side to the upper side; a material supply device which is connected to a central part on one end side of the vertically lower side inside the reaction chamber and supplies a material particle into the reaction chamber of a vertically upper side from a material supply port; a first electrode arrangement region which protrudes in an inward radial direction to be disposed on an inner peripheral wall in the reaction chamber which is vertically above the material supply device, and includes a plurality of lower electrodes to which AC power is applied; a second electrode arrangement region which protrudes in an inward radial direction to be disposed on an inner peripheral wall in the reaction chamber which is vertically above the first electrode arrangement region, and includes a plurality of upper electrodes to which AC power is applied; a collector which is connected to the other end side in the reaction chamber of the vertically upper side so as to collect fine particles; a power source which is capable of changing a frequency of AC power applied to at least one of the lower electrode included in the first electrode arrangement region (Continued)

and the upper electrode included in the second electrode arrangement region; and a controller which sets the frequency of AC power applied to the lower electrode as a frequency equal to or higher than a frequency of AC power applied to the upper electrode, in which a fine particle is generated from the material particle by generating arc discharge by the lower electrode and the upper electrode, and generating plasma in the reaction chamber.

5 Claims, 5 Drawing Sheets

(52) U.S. Cl.
CPC .............. *B01J 2219/0809* (2013.01); *B01J 2219/0815* (2013.01); *B01J 2219/0879* (2013.01); *B01J 2219/0898* (2013.01); *B22F 2202/13* (2013.01); *B22F 2304/05* (2013.01); *B22F 2999/00* (2013.01)

(56) References Cited

U.S. PATENT DOCUMENTS

| | | |
|---|---|---|
| 2016/0207113 A1 | 7/2016 | Nagai et al. |
| 2017/0136546 A1 | 5/2017 | Nagai et al. |
| 2017/0274344 A1 | 9/2017 | Koiwasaki et al. |

FOREIGN PATENT DOCUMENTS

| | | |
|---|---|---|
| CN | 107224944 | 10/2017 |
| JP | 6-111996 | 4/1994 |
| JP | 2004-263257 | 9/2004 |
| JP | 2005-343784 | 12/2005 |
| JP | 2013-082591 | 5/2013 |
| JP | 2016-131935 | 7/2016 |

FINE PARTICLE PRODUCING APPARATUS AND FINE PARTICLE PRODUCING METHOD

TECHNICAL FIELD

The technical field relates to a fine particle producing apparatus and a fine particle producing method used for an electrode material of a lithium ion battery, a catalyst material, a coating material to a film material of food packaging, an ink raw material used for electronic equipment wiring, or the like.

BACKGROUND

In recent years, application of nanometer order fine particles to various devices has been studied. For example, metal fine particles of nickel are currently used for ceramic capacitors, and the use of fine particles having a particle diameter of 200 nm or less and good dispersibility has been studied for next-generation ceramic capacitors.

Furthermore, fine particles of silicon monoxide (SiOx: x=1 to 1.6) having a lower content of oxygen than that of silicon dioxide have been utilized as an evaporation material for an antireflection film of an optical lens or a gas barrier film for food packaging. Recently, it has been expected to be applied to a negative electrode material of a lithium ion secondary battery and the like.

General producing methods of these nanometer-order fine particles include a method of introducing a bulk material as a raw material together with beads such as ceramics or zirconia and fine pulverizing the material by mechanical pulverization, a method of melting and evaporating a material and injecting the material into air or water to obtain fine particles, or a method of obtaining fine particles in a chemical manner such as electrolysis or reduction. Among them, there is a method of producing fine particles in a gas phase utilizing thermal plasma (about 10000° C.) such as high frequency discharge, direct current, or alternating current arc discharge. A method of preparing fine particles in a gas phase utilizing this thermal plasma is very useful from the viewpoints that impurities (contamination) are small, the dispersibility of the produced fine particles is excellent, and synthesis of composite fine particles composed of plural types of materials is easy.

FIG. 4 is a schematic sectional view of a fine particle producing apparatus using thermal plasma of Conventional Example 1 as viewed from a direction perpendicular to a vertical direction. For the sake of convenience, one direction in a horizontal plane is defined as an x direction, and the vertically upper side is defined as a z direction.

Reaction chamber 101 is configured to include material supply device 110, a plurality of electrodes 104 for generating an arc discharge, a fine particle collector 103 for collecting produced fine particles 118, a gas supply pipe (not shown) for supplying gas to reaction chamber 101, a valve for adjusting pressure, and a pump 113 for exhausting gas. Arc discharge 116 which is the thermal plasma is generated by introducing argon gas from the gas supply pipe into reaction chamber 101, adjusting the pressure and then applying AC power from a plurality of AC power source 105 to a plurality of electrodes 104. Material particle 117 in material supply device 110 is introduced together with the carrier gas from the vertically lower side to generated arc discharge 116. Introduced material particle 117 is evaporated and vaporized by arc discharge 116, and rapidly cooled and solidified at the upper portion of reaction chamber 101 to produce fine particles 118. Produced fine particles 118 are introduced into fine particle collector 103 while resting on the gas flow in reaction chamber 101, and collected by a filter in fine particle collector 103.

Japanese Patent Unexamined Publication No. 2004-263257 is an example of the related art.

SUMMARY (a) to (c) of FIG. 5 are diagrams schematically illustrating a state of discharge at a certain moment when polyphase AC arc plasma used in Conventional Example 1 was observed with a high-speed camera. (a) to (c) of FIG. 5 are sectional views (x-y planes), as viewed from the +z direction, of a portion which is surrounded by electrode 104 in FIG. 4, and in which arc discharge 116 is generated. Black triangles "▲" illustrated in FIG. 5 represent tip end 120 of electrode 104 illustrated in FIG. 4 of Conventional Example 1, and six electrodes 104 are arranged in a radial direction at intervals of 60°. Arc discharge 116 can be generated in the planar direction by applying AC power with a phase shifted by 60° from electrode 104, that is, from electrode E1 to electrode E6. Arc discharge region 121 at a certain moment illustrated in FIG. 5 shows a high temperature region of 5000° C. or higher as a result of gas temperature measurement by spectroscopic analysis. As illustrated in (a) of FIG. 5, at a certain moment, arc discharge D1 is generated from tip end 120 of electrode E1, and arc discharge D4 is generated from tip end 120 of electrode E4. At the next moment (refer to (b) of FIG. 5), arc discharge D2 is generated from electrode E2, and arc discharge D5 is generated from electrode E5. Further, at the next moment (refer to (c) of FIG. 5), arc discharge D3 is generated from electrode E3, and arc discharge D6 is generated from electrode E6. As illustrated in (a) to (c) of FIG. 5, arc discharges D1 to D6 are sequentially generated from electrode E1 to electrode E6 in a clockwise direction, and a repetitive discharge occurs to electrode E1. At that time, arc discharge D1 itself also swings from the left side to the right side with respect to electrode 104, and overlaps the discharge from the other electrode 104, and thereby arc discharge region 121 becomes large, and disappears at the next moment. The discharge from electrode E1 to electrode E6 is driven at a commercial frequency of 60 Hz, which is the commercial frequency of AC power, and repeated arc discharge occurs at 16.7 ms in one cycle.

However, there is a problem in that the processing efficiency is low due to the fact that only the discharge from electrode E1 to electrode E6 generates a material that is not processed at all (unprocessed) or a material that is not sufficiently heated until evaporation and melted. This is because region 122 where there is no arc discharge temporally exists and the material slips through it.

An object of the present disclosure is to provide a fine particle producing apparatus and a fine particle producing method capable of improving the processing efficiency of material particles and increasing the production amount of fine particles in consideration of the above-described problems in the related art.

In order to achieve the object, a fine particle producing apparatus according the present disclosure includes a reaction chamber extending vertically from the lower side to the upper side; a material supply device which is connected to a central part on one end side of the vertically lower side inside the reaction chamber and supplies a material particle into the reaction chamber of the vertically upper side from a material supply port; a first electrode arrangement region which protrudes in an inward radial direction to be disposed on an inner peripheral wall in the reaction chamber which is vertically above the material supply device, and includes a plurality of lower electrodes to which AC power is applied; a second electrode arrangement region which protrudes in an inward radial direction to be disposed on an inner peripheral wall in the reaction chamber which is vertically above the first electrode arrangement region, and includes a plurality of upper electrodes to which AC power is applied; a collector which is connected to the other end side in the reaction chamber of the vertically upper side so as to collect fine particles; a power source which is capable of changing a frequency of AC power applied to at least one of the lower electrode included in the first electrode arrangement region and the upper electrode included in the second electrode arrangement region; and a controller which sets the frequency of AC power applied to the lower electrode as a frequency equal to or higher than the frequency of AC power applied to the upper electrode, in which a fine particle is generated from the material particle by generating arc discharge by the lower electrode and the upper electrode, and generating plasma in the reaction chamber.

In addition, a fine particle producing method according to the present disclosure includes supplying a material particle from a material supply port upward from a vertically lower side in a reaction chamber upwardly extending from the vertically lower side; producing a fine particle from at least a part of the material particle by applying AC power to a plurality of lower electrodes arranged in a first electrode arrangement region vertically above the material supply port, generating arc discharge, and generating plasma in the reaction chamber; producing a fine particle from at least a part of the material particle by applying AC power to a plurality of upper electrodes arranged in a second electrode arrangement region vertically above the first electrode arrangement region, generating plasma, and generating plasma in the reaction chamber; and collecting the fine particles from the second electrode arrangement region of the vertically upper side.

According to the above aspect of the present disclosure, a plurality of electrodes are arranged to form a multistage electrode configuration, and the frequency of the AC power applied to the lower electrode of the first electrode arrangement region which is a material particle supply port side is made higher than the commercial frequency. With this, the probability that the material particles supplied to the central part of the first electrode arrangement region are processed is increased and non-processed materials can be reduced. As a result, the evaporation efficiency of the material particles is increased, and the material particles can be processed in large quantities, and thus it is possible to provide a fine particle producing apparatus and a fine particle producing method capable of increasing a production amount of fine particles at low cost.

DESCRIPTION OF EMBODIMENTS

Figure 1:
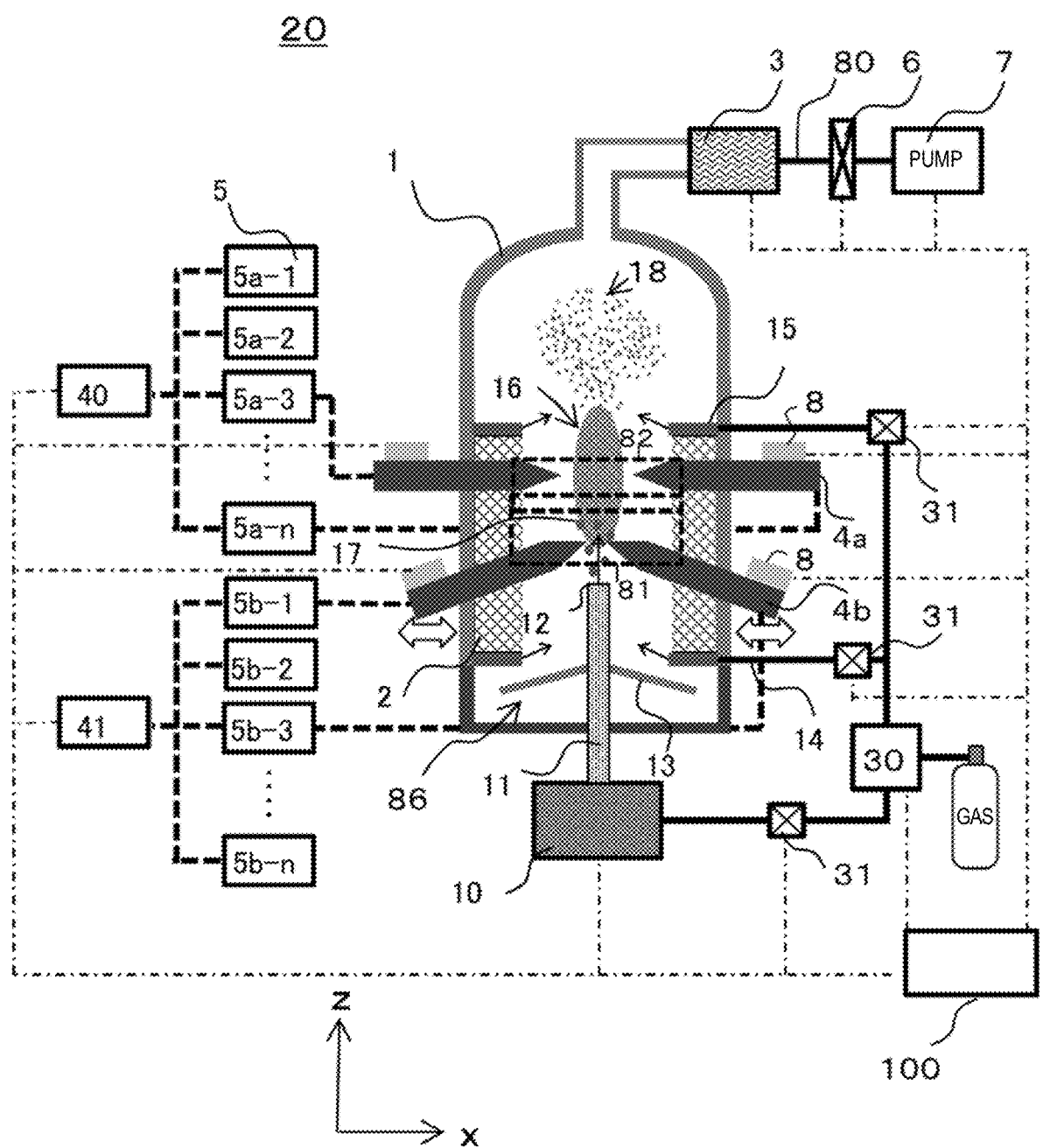
FIG. 1 is a schematic sectional view of a fine particle producing apparatus according to a first embodiment as viewed in a direction perpendicular to a vertical direction.

A fine particle producing apparatus according a first embodiment includes a reaction chamber extending vertically from the lower side to the upper side; a material supply device which is connected to a central part on one end side of the vertically lower side inside the reaction chamber and supplies a material particle into the reaction chamber of the vertically upper side from a material supply port; a first electrode arrangement region which protrudes in an inward radial direction to be disposed on an inner peripheral wall in the reaction chamber which is vertically above the material supply device, and includes a plurality of lower electrodes to which AC power is applied; a second electrode arrangement region which protrudes in an inward radial direction to be disposed on an inner peripheral wall in the reaction chamber which is vertically above the first electrode arrangement region, and includes a plurality of upper electrodes to which AC power is applied; a collector which is connected to the other end side in the reaction chamber of the vertically upper side so as to collect fine particles; a power source which is capable of changing a frequency of AC power applied to at least one of the lower electrode included in the first electrode arrangement region and the upper electrode included in the second electrode arrangement region; and a controller which sets a frequency of AC power applied to the lower electrode as a frequency equal to or higher than a frequency of AC power applied to the upper electrode, in which a fine particle is generated from the material particle by generating arc discharge by the lower electrode and the upper electrode, and generating plasma in the reaction chamber.

Regarding a fine particle producing apparatus according to a second embodiment, in the first embodiment, the lower electrode and the upper electrode may be arranged such that a diameter of a circle formed by tip ends of the lower electrode included in the first electrode arrangement region is equal to or smaller than a diameter of a circle formed by tip ends of the upper electrode included in the second electrode arrangement region.

Regarding a fine particle producing apparatus according to a third embodiment, in the first or second embodiment, the lower electrode included in the first electrode arrangement region and the upper electrode included in the second electrode arrangement region may be arranged so as not to overlap with each other when viewed in a direction in which the material particles flow to the vertically upper side from the vertically lower side.

Regarding a fine particle producing apparatus according to a fourth embodiment, in the third embodiment, the lower electrode and the upper electrode may be arranged so as to be relatively shifted by 30° when viewed from the vertically upper side.

Regarding a fine particle producing apparatus according to a fifth embodiment, in the first to fourth embodiments, the upper electrode and the lower electrode are inclined in the same direction, and the upper electrode may be installed so that an angle with respect to a horizontal plane is smaller than an angle of the lower electrode with respect to the horizontal plane when the lower electrode and the upper electrode are projected onto a plane including in a direction in which the material particles flow of a vertically upper side from a vertically lower side.

A fine particle producing method according to a sixth embodiment includes supplying a material particle from a material supply port upward from a vertically lower side in a reaction chamber upwardly extending from the vertically lower side; producing a fine particle from at least a part of the material particle by applying AC power to a plurality of lower electrodes arranged in a first electrode arrangement region vertically above the material supply port, generating arc discharge, and generating plasma in the reaction chamber; producing a fine particle from at least a part of the material particle by applying AC power to a plurality of upper electrodes arranged in a second electrode arrangement region vertically above the first electrode arrangement region, generating plasma, and generating plasma in the reaction chamber; and collecting the fine particles from the second electrode arrangement region of the vertically upper side.

Regarding a fine particle producing method according to a seventh embodiment, in the sixth embodiment, the frequency of the AC power applied to the lower electrode may be set as a frequency equal to or higher than the frequency of the AC power applied to the upper electrode. It is desirable to set the frequency to be in a range of 50 Hz to 1000 Hz.

Hereinafter, a fine particle producing apparatus according to embodiments will be described in detail with reference to the attached drawings. In the drawings, substantially the same members are denoted by the same reference numerals.

First Embodiment

Figure 2A:
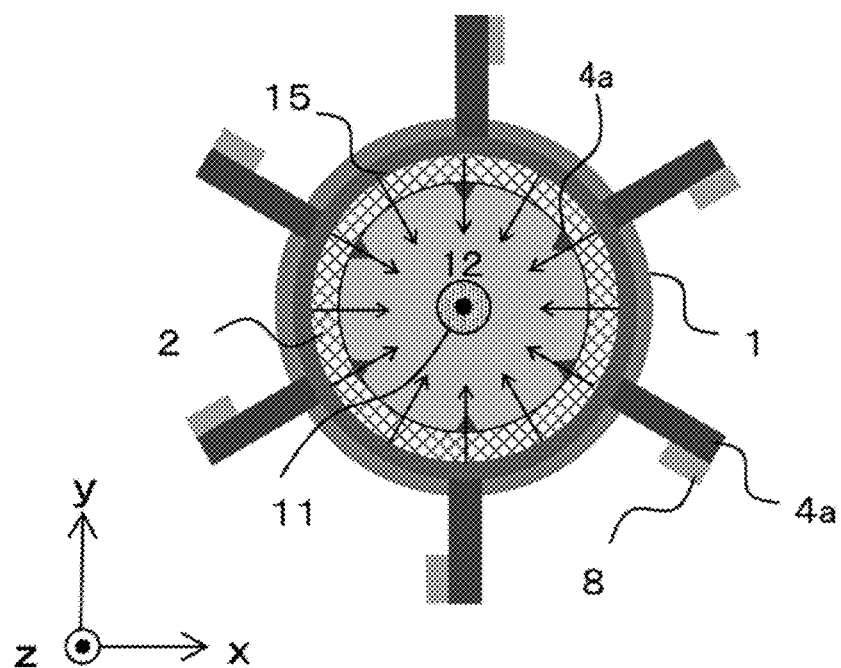
FIG. 2A is a partially schematic sectional view (x-y plane view) seen from a +z direction in a second electrode arrangement region near an upper electrode of the fine particle producing apparatus of the first embodiment.
Figure 2B:
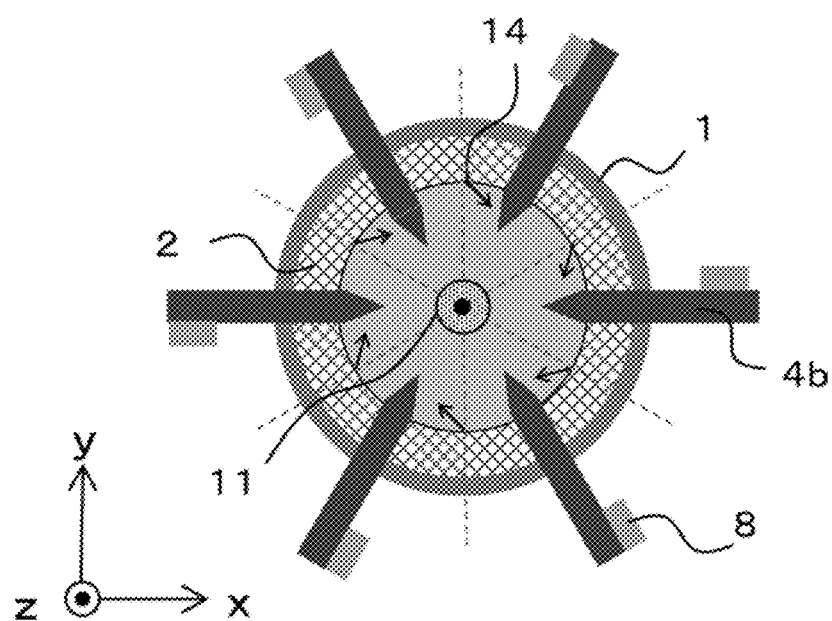
FIG. 2B is a partially schematic sectional view (x-y plane view) seen from a +z direction in a first electrode arrangement region near a lower electrode of the fine particle producing apparatus of the first embodiment.

FIG. 1 illustrates a schematic sectional view of a fine particle producing apparatus 20 according to a first embodiment as viewed in a direction perpendicular to a vertical direction. FIG. 2A is a partially schematic sectional view (x-y plane view) seen from a +z direction in a second electrode arrangement region near an upper electrode of the fine particle producing apparatus according to the first embodiment. FIG. 2B is a partially schematic sectional view (x-y plane view) seen from a +z direction in a first electrode arrangement region near the lower electrode. For the sake of convenience, one direction in a horizontal plane is defined as an x direction, and the vertically upper side is defined as a z direction. An example of producing fine particles of nanometer order of silicon will be described as an example with reference to FIG. 1, FIGS. 2A, and 2B.

Fine particle producing apparatus 20 according to the first embodiment includes at least a reaction chamber 1 as an example of a reaction chamber, a material supply device 10, a plurality of upper electrodes 4a and lower electrodes 4b that generate arc discharge 16, and a fine particle collector 3 as an example of collector for collecting produced fine particles 18. By this fine particle producing apparatus 20, arc discharge 16 is generated in reaction chamber 1, and fine particle 18 can be produced from material particle 17.

Further, in addition to the above-described configuration, fine particle producing apparatus 20 according to the first embodiment further includes material supply pipe 11, discharge gas supply pipe 14 for controlling the flow of material particle 17 and the material gas vaporized by the material, and cooling gas supply pipe 15 for cooling the vaporized raw material gas. Further, pressure regulating valve 6 and an exhaust pump 7 are provided at the rear stage of fine particle collector 3 via pipe 80 so that the pressure inside reaction chamber 1 can be adjusted.

Hereinafter, the configuration of fine particle producing apparatus 20 will be described in detail.

Material supply device Material supply device 10 is disposed below the bottom of reaction chamber 1 and supplies material particle 17 upward through material supply port 12 at the upper end of material supply pipe 11 by the carrier gas into reaction chamber 1.

On the side wall of reaction chamber 1, a water cooling mechanism (not shown) is provided. Further, the inner surface of the side wall of reaction chamber 1 has a structure covered with cylindrical heat insulating member 2 made of a carbon material in order to retain the heat of arc discharge 16. As a specific example of heat insulating member 2, a carbon-based material can be used as a material of heat insulating member 2, but depending on the type of the fine particles to be produced or the type of device to be used, a material (for example, a ceramic material or the like) in which impurities are difficult to enter may be used.

Discharge gas supply pipe Discharge gas supply pipes 14 are a plurality of discharge gas supply pipes on the lower side of reaction chamber 1 and are arranged radially at predetermined intervals around the central axis of reaction chamber 1 on the lower side of heat insulating member 2 so that discharge gas can be supplied toward the center of reaction chamber 1. Specifically, in each discharge gas supply pipe 14, an opening is disposed on the lower side of reaction chamber 1 from material supply port 12, and the discharge gas is supplied from gas supply device 30 via gas flow rate regulator 31. For example, a gas can be supplied as a swirling flow by discharging discharge gas supply pipe 14 in a direction inclined by 30° vertically upward from a horizontal plane (x-y plane) and as illustrated in FIG. 2B, by 45° from a radial direction (inward direction) in the horizontal plane. In this manner, discharge gas supply pipe 14 supplies gas in a direction inclined vertically upward by 30° and 45° from the radial direction in the horizontal plane, but the present disclosure is not limited thereto, and a gas flow directed to the center portion in the region between upper electrode 4a and lower electrode 4b may be generated in discharge gas supply pipe 14.

Cooling Gas Supply Pipe

Cooling gas supply pipes 15 are a plurality of cooling gas supply pipes on the upper side of reaction chamber 1 and are arranged radially at predetermined intervals around the central axis of reaction chamber 1 on the upper side of heat insulating member 2 so that cooling gas can be supplied toward the center of reaction chamber 1. Specifically, in each cooling gas supply pipe 15, an opening is disposed on the upper side of reaction chamber 1 from upper electrode 4a, and the cooling gas is supplied from gas supply device 30 via gas flow rate regulator 31. For example, cooling gas supply pipe 15 causes the cooling gas to be discharged at 30° vertically upward from the horizontal plane (x-y plane) and in a radial direction (inward direction) in a horizontal plane as illustrated in FIG. 2A. As a result, the gas evaporated and vaporized by arc discharge 16 can be efficiently cooled, and the particle diameter of fine particle 18 to be produced can be controlled.

First Electrode Arrangement Region and Second Electrode Arrangement Region

Upper electrodes 4a and lower electrodes 4b are respectively arranged on the upper and lower parts of heat insulating member 2 so as to be arranged in upper and lower two stages with a predetermined space therebetween. Specifically, lower electrodes 4b are arranged in first electrode arrangement region (lower electrode arrangement region) 81 on the material supply port side. In addition, upper electrodes 4a are arranged in second electrode arrangement region (upper electrode arrangement region) 82 separated from first electrode arrangement region 81 on the fine particle collector side.

First electrode arrangement region 81 and second electrode arrangement region 82 intersect (for example, orthogonal to) each other in a direction (for example, a direction from upward to downward) in which material particles 17 flow from the vicinity of material supply port 12 to fine particle collector 3. Each of regions 81 and 82 is composed of, for example, a single plane, and a plurality of electrodes 4b and 4a may be arranged along the surface or inclined at a predetermined angle with a predetermined angular interval in the plane.

As an example, as illustrated in FIGS. 1, 2A, and 2B, metal upper electrodes 4a and metal lower electrodes 4b that generate arc discharge 16 can be arranged in two stages on the upper and lower sides. Specifically, for example, upper electrodes 4a are arranged so as to protrude inwardly in a radial direction while being inclined vertically upward by 5° with respect to the horizontal direction. Six upper electrodes 4a are radially arranged in parallel at intervals of 60° on the cylindrical inner peripheral wall of reaction chamber 1. Specifically, for example, lower electrodes 4b are arranged so as to protrude inwardly in a radial direction while being inclined vertically upward by 30° with respect to the horizontal direction. Six lower electrodes 4b are radially arranged in parallel at intervals of 60° on the cylindrical inner peripheral wall of reaction chamber 1. Further, as illustrated in FIGS. 2A and 2B, upper electrodes 4a and lower electrodes 4b are arranged so as not to overlap when viewed from the direction in which material particles 17 flow (for example, from the vertically lower side to the upper side). In other words, upper electrodes 4a and lower electrodes 4b are arranged so as to be shifted by 30° relative to the z axis when viewed vertically above or below reaction chamber 1.

By horizontally or inclining upper electrodes 4a and lower electrodes 4b with respect to the direction in which the material particles 17 flow, it is possible to introduce the material particles into the plasma without being repelled by highly viscous thermal plasma. Furthermore, upper electrodes 4a and lower electrodes 4b are inclined in the same direction, and as compared with the installation angle of upper electrode 4a, it is possible to place the material in the ascending airflow at the center of the material by setting the installment angle of lower electrode 4b to be larger in the direction in which the material particles flow, and thereby it is possible to suppress spreading of the material. From these facts, it is possible to increase material processing efficiency.

A diameter of a circle formed by the tip ends of lower electrodes 4b is smaller than a diameter of a circle formed by the tip ends of upper electrodes 4a. This is because lower electrodes 4b are located very close to material supply port 12, there is a high probability that material particles 17 introduced from material supply port 12 are introduced into arc discharge (high temperature region) 16 generated in lower electrodes 4b. In addition, the smaller the discharge area, the higher the power density and the higher the temperature. Therefore, it is better that the diameter of the circle formed by the tip ends of the lower electrodes 4b is narrow. On the contrary, due to upper electrodes 4a far from material supply port 12, and the complicated flow of gas, it is considered that the distribution of material particles 17 including a material processed by arc discharge 16 by lower electrodes 4b and/or an unprocessed material flowing from material supply port 12. Therefore, it is considered that the larger the diameter of the circle formed between the tip ends of the upper electrodes 4a, the higher the efficiency of being processed by arc discharge 16 by upper electrodes 4a becomes.

Upper electrodes 4a and lower electrodes 4b are each constituted by a metal electrode, and in order to prevent the metal material from mixing as impurities of the fine particles 18 to be produced, cooling water and cooling gas flow so as to reduce consumption due to evaporation of the metal electrode. As examples of the materials of upper and lower electrodes 4a and 4b, a material obtained by mixing several % of lanthanum oxide (lanthana) to a tungsten electrode which is a refractory metal can be used, but in place of this, another high melting point metal such as tungsten or tantalum, an electrode material formed by mixing several % of thorium, cerium, yttrium or the like into tungsten, or an electrode composed of a carbon material may be used.

As an example, in the embodiment, six upper electrodes 4a and six lower electrodes 4b are arranged in two stages in a radial direction, but the present disclosure is not limited thereto. For example, if the number of electrodes is a multiple of 6, the number of electrodes may be increased. Alternatively, the twelve electrodes may be arranged on the same plane, a two-stage structure of six lower electrodes and twelve upper electrodes, or three or more stages of further electrode arrangement may be adopted. Polyphase AC arc plasma as an example of plasma generated by such electrodes has high degree of freedom of electrode arrangement as compared to a case of using a method of generating other thermal plasma. Therefore, the size or shape of arc discharge (thermal plasma) 16 for evaporating material particles 17 can be freely designed. Therefore, as the polyphase AC arc plasma, it is possible to adopt a vertically elongated discharge, a discharge having a large area in a planar manner, an optional discharge shape according to the process, and improve the processing efficiency or increase the throughput.

Each of upper and lower electrodes 4a and 4b are connected to n (n is an integer of 2 or more, for example, in a case of six electrodes, n=6) AC power sources 5a and 5b on the upper and lower sides. Specifically, upper first AC power source 5a-1, upper second AC power source 5a-2, upper third AC power source 5a-3, . . . , upper n-th AC power source 5a-n, are connected to inverter 40. In addition, lower first AC power source 5b-1, lower second AC power source 5b-2, lower third AC power source 5b-3, . . . , lower n-th AC power source 5b-n are connected to inverter 41. The AC power source whose phases are shifted from each other is applied from AC power sources 5a and 5b to the plurality of upper electrodes 4a and the plurality of lower electrodes 4b by inverter 40 and inverter 41 so as to generate arc discharge 16 which is thermal plasma.

Upper and lower electrodes 4a and 4b are independently configured to be movable back and forth in the radial direction with respect to the center of reaction chamber 1 by electrode driving device 8 composed of a motor or the like. As an example of electrode driving device 8, a ball screw is rotated forwardly and reversely by a motor so that electrodes 4*a* and 4*b* connected to a nut member screwed into the ball screw are advanced and retracted in the axial direction.

Fine Particle Collector

Fine particle collector 3 is disposed so as to be connected to the upper end of reaction chamber 1 and is exhausted by exhaust pump 7 through pipe 80 to collect fine particles 18 generated in reaction chamber 1. The plurality of electrodes 4*a* and 4*b* are arranged in the side part of the middle part of reaction chamber 1 in upper and lower two stages at predetermined intervals so that the tip ends protrude into the inside. In reaction chamber 1, thermal plasma (that is, arc discharge) 16, and fine particles 18 are produced from material particles 17 supplied from material supply device 10 by generated thermal plasma 16.

Controller 100 is connected to each of material supply device 10, fine particle collector 3, pressure regulating valve 6, exhaust pump 7, gas supply device 30, gas flow rate regulator 31, AC power sources 5*a* and 5*b*, and each electrode driving device 8. By this controller 100, the respective operations can be controlled.

Figure 3:
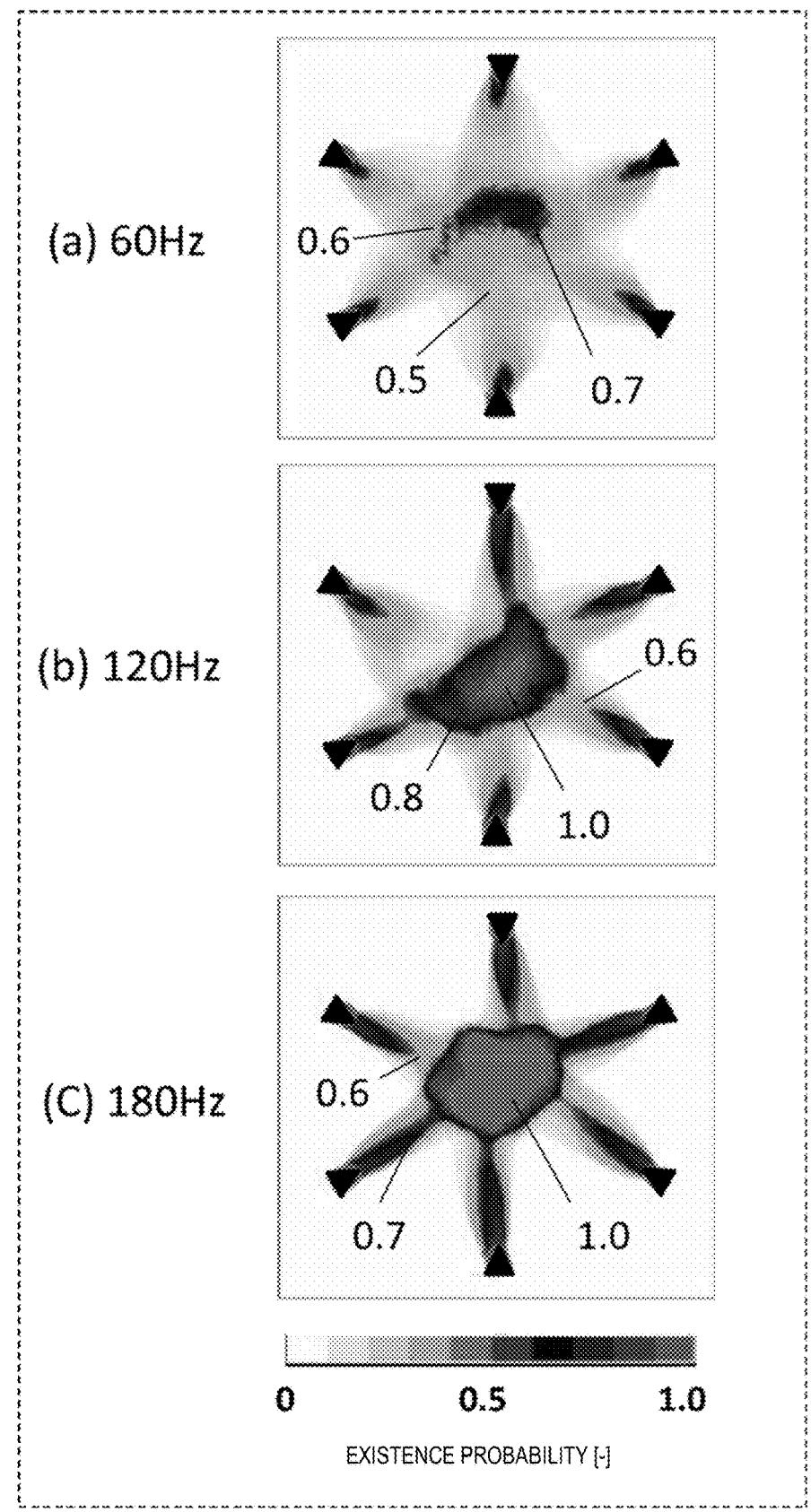
FIG. 3 shows schematic diagrams (a) to (c) of existence probability distributions of arc discharge of one cycle of polyphase AC arc plasma measured with a high-speed camera via a band-pass filter.
Figure 4:
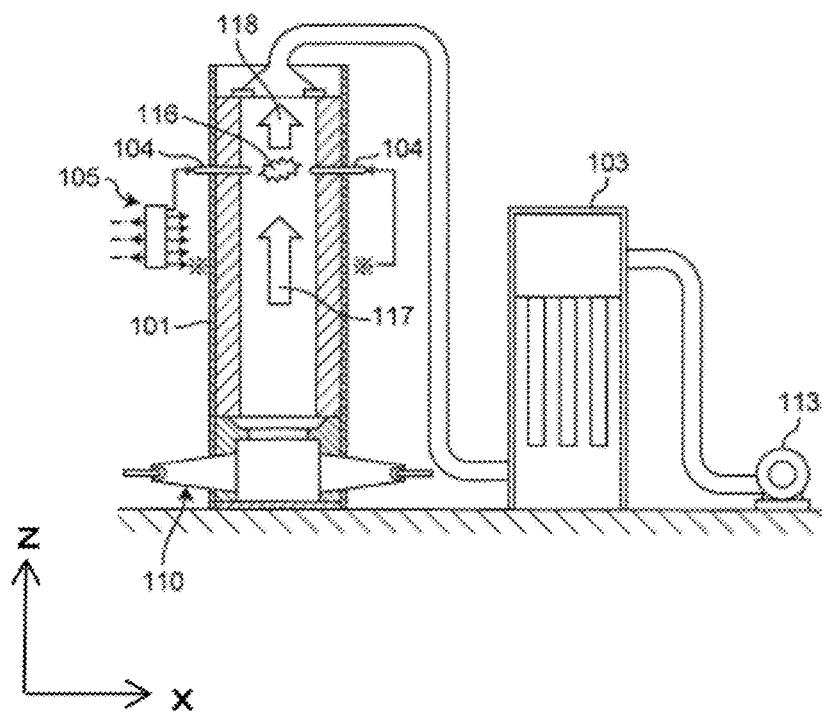
FIG. 4 is a schematic sectional view of a fine particle producing apparatus of Conventional Example 1 as viewed from a direction perpendicular to a vertical direction.

A description will be given of a result of a case where an arc discharge is generated by using the apparatus having the above configuration and the frequency of AC power for generating plasma is changed. (a) to (c) of FIG. 3 are schematic diagrams of existence probability distributions of arc discharge of one cycle of polyphase AC arc plasma measured with a high-speed camera via a band-pass filter. By interposing inverter 40 at the front stage of AC power source 5*a-n* applied to upper electrodes 4*a* of second electrode arrangement region (upper electrode arrangement region) 82 as illustrated in FIG. 1, the frequency of the electric power output from AC power source 5*a-n* is changed to 60 Hz (a), 120 Hz (b), and 180 Hz (c). The plasma light generated by the arc discharge was spectrally separated by a band-pass filter (675±1.5 nm, 794±1.5 nm) of two wavelengths of atomic emission of argon (Ar), and the spectrally separated light was observed with a high-speed camera. (a) of FIG. 3 illustrates a case where a plasma drive frequency is normally 60 Hz, and a black triangular mark "▲" on the outer periphery indicates six tip ends of upper electrodes 4*a*. The part with a color from gray to black indicates the probability distribution that the arc discharge existed during one cycle (16.8 ms) of the high temperature region of 7000° C. or higher as a result of gas temperature measurement by spectroscopic analysis. That is, contrasting density corresponds to the high and low of the existence probability of the arc discharge, and as the density becomes dark, that is, as it approaches black, the existence probability of the arc discharge is increased. In (a) of FIG. 3, it can be understood that the region in which the arc discharge existed is larger than the region when the drive frequency is high as illustrated in (b) and (c) of FIG. 3. This indicates that the arc discharge swings to the left and right with a frequency of 60 Hz as described above. In addition, the darker portion in the central part indicates a probability of 0.7, and indicates that the time of 70% in one cycle was at 7000° C. or higher. As illustrated in (b) and (c) of FIG. 3, when the frequency for driving the plasma is increased, the existence probability distribution of the plasma gathers in the central part. In (c) of FIG. 3 with a drive frequency of 180 Hz, the spread of the arc discharge near the electrode is smaller than that in the case of (a) of FIG. 3, but in the central part of second electrode arrangement region (upper electrode arrangement region) 82, the existence probability of the arc discharge was 1.0, which indicates that the arc discharge at 7000° C. or higher stayed constantly in one cycle.

Based on the result of FIG. 3, by configuring inverter 41 connected to lower electrodes 4*b* of first electrode arrangement region (lower electrode arrangement region) 81 on the material supply port side to be installed, a frequency higher than 60 Hz which is a commercial frequency can be applied for the AC power output from AC power source 5*b-n*. In this example, 60 Hz is used as the commercial frequency, but it may be 50 Hz. It is desirable to set the frequency to be in a range of 50 Hz to 1000 Hz. At a frequency exceeding 300 Hz, as illustrated in (c) of FIG. 3, the arc discharge is concentrated in the center, and the discharge distribution hardly changes. For this reason, it is particularly preferable to select the frequency of 50 Hz to 300 Hz. By adopting this configuration, material particles 17 not spreading in the vicinity of material supply port 12 can be efficiently introduced into the arc discharge, and the processing efficiency can be improved. In addition, even in a case where many materials are introduced, the arc discharge constantly stays in the central part, so that the proportion of particles which can pass through without hitting the arc discharge can be extremely lowered, and the processing efficiency can be improved. In addition, inverter 40 connected to upper electrodes 4*a* of second electrode arrangement region (upper electrode arrangement region) 82 on the fine particle collector side is installed.

With this, the AC power output from AC power source 5*a-n* can be set to a frequency equal to or lower than the frequency of the AC power output by AC power source 5*b-n* by inverter 41 connected to lower electrodes 4*b* of first electrode arrangement region (lower electrode arrangement region) 81. In second electrode arrangement region (upper electrode arrangement region) 82 on the fine particle collector side, the material is far away from material supply port 12 and further passes through first electrode arrangement region (lower electrode arrangement region) 81. Therefore, material particles 17 and the material being processed widely expand compared with those in first electrode arrangement region (lower electrode arrangement region) 81.

In this regard, the frequency of AC power applied to upper electrodes 4*a* of second electrode arrangement region (upper electrode arrangement region) 82 is controlled by the controller 100 to be equal to or lower than the frequency of the AC power applied to lower electrodes 4*b* of first electrode arrangement region (lower electrode arrangement region) 81. This makes it possible to widen the area of the arc discharge by upper electrodes 4*a* of second electrode arrangement region (upper electrode arrangement region) 82 and so as to improve the processing efficiency of the material particles.

In this embodiment, inverters 40 and 41 are installed to increase the output frequency of AC power sources 5*a-n* and 5*b-n* to be higher than 60 Hz which is the commercial frequency; however, AC power source having a function of varying the frequency of AC power sources 5*a-n* and 5*b-n* may be used.

Fine particle collector 3 is disposed so as to be connected to the upper end of reaction chamber 1 and is exhausted by exhaust pump 7 through pipe 80 to collect fine particles 18 generated in reaction chamber 1. The plurality of electrodes 4*a* and 4*b* are arranged in the side part of the middle part of reaction chamber 1 in upper and lower two stages at predetermined intervals so that the tip ends protrude into the inside. Thermal plasma (that is, arc discharge) 16 is generated by upper electrode 4*a* and lower electrode 4*b* in reaction chamber 1, and with generated thermal plasma 16, fine particles 18 are produced from material particles 17 supplied from material supply device 10.

Fine Particle Producing Method

The fine particle producing method using the fine particle producing apparatus according to the above configuration includes at least three steps of generating thermal plasma 16 by arc discharge, supplying material particles 17 to thermal plasma 16, and generating fine particles 18. These operations can be automatically executed by being controlled by controller 100.

First, in reaction chamber 1, the AC power is applied to each of upper electrodes 4a and lower electrodes 4b, which are arranged in parallel so as to have two or more stages in the direction in which the material particles 17 flow. As a result, the arc discharge is generated by each of upper electrodes 4a and lower electrodes 4b, and vertically elongated thermal plasma 16 is generated in the direction in which material particles 17 flow (that is, vertically upward from the vertically lower side, z direction).

Next, material particles 17 are supplied from material supply port 12 of material supply device 10 into the region of thermal plasma 16.

Then, when material particles 17 pass through the region of thermal plasma 16, those are evaporated or vaporized into material gases, and at the moment when the material gas extracted from the region of thermal plasma 16, the material gas is rapidly cooled, and thereby fine particles 18 are produced.

Hereinafter, the fine particle producing method will be described in detail according to procedure actually performed.

First, reaction chamber 1, fine particle collector 3, and material supply device 10 are exhausted to several 10 Pa by exhaust pump 7, thereby reducing the influence of atmospheric oxygen.

Next, the gas is supplied from gas supply device 30 to each of material supply device 10, discharge gas supply pipe 14, and cooling gas supply pipe 15 via gas flow rate regulator 31, and the pressure inside reaction chamber 1 is adjusted with pressure regulating valve 6 attached to the front stage of exhaust pump 7. From discharge gas supply pipe 14 on the lower side of reaction chamber 1, gas is supplied from a plurality of supply ports, and the gas is discharged in a direction inclined by 30° vertically upward from a horizontal plane and as illustrated in FIG. 2B, by 45° from an inward radial direction in the horizontal plane. As a result, the gas can be supplied as a swirling flow.

Cooling gas supply pipe 15 on the upper side of reaction chamber 1 supplies gas from a plurality of supply ports into reaction chamber 1 and discharges cooling gas at 30° vertically upward from the horizontal plane (x-y plane) and in an inward radial direction in a horizontal plane as illustrated in FIG. 2A. As a result, the gas evaporated and vaporized by arc discharge 16 can be efficiently cooled, and the particle diameter of fine particle 18 to be produced can be controlled.

In one example of the first embodiment, in order to produce silicon fine particles, in reaction chamber 1, argon is supplied from gas supply device 30 via discharge gas supply pipe 14 and cooling gas supply pipe 15. Specifically, the inside of reaction chamber 1 was maintained at a desired pressure of an inert gas atmosphere of argon at 0.3 atm to 1.2 atm, and the following fine particle producing steps were performed. Here, an inert gas is used as a discharge gas and a cooling gas, but argon may be used for both gases, for example. In order to accelerate the reduction of the material, a small amount of hydrogen gas and a small amount of carbonized gas may be mixed and introduced into reaction chamber 1 from gas supply device 30 via discharge gas supply pipe 14 and cooling gas supply pipe 15. Similarly, a small amount of oxygen gas, nitrogen gas, or carbonization gas may be mixed for oxidizing, nitriding or carbonizing the material or coating the carbon film.

Next, arc discharge 16 is generated to generate thermal plasma. As an example, as illustrated in FIGS. 1, 2A, and 2B, metal upper electrodes 4a and metal lower electrodes 4b that generate arc discharge 16 are arranged in two stages on the upper and lower sides. Specifically, for example, upper electrodes 4a are arranged so as to protrude in the horizontal direction or inwardly in the radial direction at an angle of 5° vertically upward with respect to the horizontal direction. Six upper electrodes 4a are radially arranged in parallel at intervals of 60° on the cylindrical inner peripheral wall of reaction chamber 1. Lower electrodes 4b are arranged so as to protrude inwardly in the radial direction at an angle of 30° vertically upward with respect to the horizontal direction in the same direction as that of upper electrodes 4a. Six lower electrodes 4b are radially arranged in parallel at intervals of 60° on the cylindrical inner peripheral wall of reaction chamber 1. Further, as illustrated in FIGS. 2A and 2B, upper electrodes 4a and lower electrodes 4b are arranged so as not to overlap when viewed from the direction in which material particles 17 flow (for example, from the vertically lower side to the upper side). In other words, upper electrodes 4a and lower electrodes 4b are arranged so as to be shifted from each other by 30° with respect to the z axis when viewed vertically above or below reaction chamber 1.

The AC power is applied to the adjacent electrodes of upper and lower electrodes 4a and 4b from upper and lower AC power sources 5a and 5b. As an example, 60 Hz AC power source having phases shifted from each other by 60° to each of six upper electrodes 4a and six lower electrodes 4b is applied from six AC power sources 5a and 5b, and elongated arc discharge 16 which is thermal plasma of approximately 10000° C. is generated. For example, in a case where the number of upper electrodes 4a is six and the number of lower electrodes 4b is six, AC power with a phase shifted by 60° can be applied, respectively, but AC power of 60 Hz with a phase shifted by 30° may be applied to twelve of upper electrodes 4a and lower electrodes 4b. As a result, upper and lower arc discharges 16 are more likely to be connected to each other, so that vertically elongated arc discharge 16 is formed in the vertical direction, and the in-plane distribution is also improved.

When arc discharge 16 is ignited after the application of the AC power, any two or three upper and lower electrodes 4a and 4b are moved to the center side of reaction chamber 1 by electrode driving device 8. After arc discharge 16 is ignited, the currents applied to upper and lower electrodes 4a and 4b are adjusted to be constant, and upper and lower electrodes 4a and 4b are moved in the radiation direction (a direction from the center position of a circle formed by tip ends of upper and lower electrodes 4a and 4b arranged radially to the outside) by electrode driving device 8 so that upper and lower electrodes 4a and 4b are brought into desired positions.

Next, supply of material to be processed is started. As an example, material particles 17 that are the raw materials of fine particles 18 are silicon powder of about 16 micron meters and are placed in material supply device 10. In the first embodiment, particles of 16 micron meters are used, but in a case of the particle size is 100 microns or less, depending on the plasma condition, the particles are evaporated by thermal plasma 16, and thereby it is possible to produce fine particles 18 of nanometer order. When using a material with a particle size larger than 100 micron meters, the material cannot be completely evaporated, and the produced fine particles may increase to micron meter order in some cases.

As an example of material supply device 10, a local flow type powder supply device can be used. In this local flow type powder supply device, the supply amount of the material can be controlled by the flow rate of a carrier gas and a rotation number of a vessel into which the material is introduced, so that the powder material can be sent to the material supply pipe 11 at a constant rate. As another example of material supply device 10, a surface copying type powder supply device for controlling the distance between the surface of a powder material and a nozzle by using a laser or the like, and a quantitative type powder supply device for supplying and sucking a fixed amount of powder material to a groove from a hopper or the like can be exemplified. Both types of powder material supply devices may be used, but depending on the amount of powder material to be supplied or the type or particle diameter of the powder material, the system of the powder material supply device is selectively used.

As illustrated in FIG. 1, material particles 17 are sent from material supply device 10 to material supply pipe 11, and introduced from material supply port 12 into reaction chamber 1. When passing through arc discharge 16, material particles 17 introduced into reaction chamber 1 are evaporated and vaporized, and material particles 17 are gasified.

Based on the result of FIG. 3, by configuring inverter 41 connected to lower electrodes 4b of first electrode arrangement region (lower electrode arrangement region) 81 on the material supply port side to be installed, a frequency higher than 50 Hz or 60 Hz which is a commercial frequency is preferably applied for the AC power output from AC power source 5b-n. Particularly, it is desirable to set the frequency to be in a range of 50 Hz to 1000 Hz. This is because the first electrode arrangement region is close to material supply port 12 and material particles 17 do not spread, and thus the materials concentrate at the central part of first electrode arrangement region 81. In particular, when the frequency of AC power source 5b-n is set to be 50 Hz to 300 Hz, a high-temperature region of 7000° C. or higher of the arc discharge always exists in the central part, and thereby it is possible to increase the processing efficiency. Even in a case where many materials are introduced, the arc discharge always exists in the central part, and thus the processing efficiency can be improved. When the frequency exceeds 300 Hz, the discharge distribution does not change greatly, and even if it changes, the processing efficiency does not change. As an example, frequency of AC power source 5b-n is set to 180 Hz by inverter 41 connected to lower electrodes 4b.

It is desirable that the AC power output from AC power source 5a-n output by inverter 40 connected to upper electrodes 4a in second electrode arrangement region (upper electrode arrangement region) 82 on the fine particle collector side is set to a frequency equal to or lower than the frequency of the AC power output by AC power source 5b-n by inverter 41 connected to lower electrodes 4b of first electrode arrangement region (lower electrode arrangement region) 81. In second electrode arrangement region (upper electrode arrangement region) 82 on the fine particle collector side, the material is far away from material supply port 12. Further, the material passes through first electrode arrangement region (lower electrode arrangement region) 81, and thus material particles 17 and the material being processed widely expand compared with those in first electrode arrangement region (lower electrode arrangement region) 81. Therefore, as illustrated in (a) of FIG. 3, by lowering the frequency of the AC power output from AC power sources 5a-n, the arc discharge region can be expanded and the processing efficiency can be improved. As an example, frequency of AC power source 5a-n is set to 60 Hz by inverter 40 connected to upper electrodes 4a.

Generally, the arc discharge (thermal plasma) at the place where the material is supplied is such that the heat of the plasma is deprived of the evaporation of material particles 17, so that the temperature of the plasma at the place where the material is evaporated drops. In the related art, in a case where a material such as a general inductively coupled plasma (ICP) torch or the like is continuously added into a continuous discharge at a high frequency wave of 1 kHz or more, the temperature of the plasma is lowered by the evaporation of the material, the material cannot be completely evaporated, and relatively large fine particles are generated, and thereby the particle size distribution is deteriorated. In addition, in order to produce fine particles having a desired particle size or to improve the particle size distribution of the produced fine particles, it is only necessary to limit the amount of material to be added, and in this case, the throughput is decreased.

On the other hand, arc discharge (polyphase AC arc plasma) 16 generated in upper and lower electrodes 4a and 4b used in the first embodiment is generated by applying the AC powers different in phase from each other to upper electrodes 4a and lower electrodes 4b. For this reason, the arc discharge is pulsed, and it is possible to always generate high-temperature thermal plasma.

Since the thermal plasma such as arc discharge 16 or the ICP torch is a viscous gas, it is not introduced into arc discharge 16 and is not processed without material particle 17 having a certain speed. Therefore, if upper electrodes 4a or lower electrodes 4b are inclined in the direction in which the gas or material particles 17 flow, it is easy to introduce material particles 17 into arc discharge 16 by the gas or discharge flow, and thereby the processing efficiency can be improved.

Material supply device 10 and material supply port 12 are installed on the lower side of arc discharge 16 in the vertical direction (z direction). In the fine particle producing apparatus, material particles 17 are supplied from the lower side of arc discharge 16 in the vertical direction. The unprocessed material particles repelled by arc discharge 16 fall downward in the vertical direction due to gravity and can be located above arc discharge 16 and separate from processed fine particles 18. These unprocessed material particles accumulate in unprocessed material reservoir 86 partitioned by cover 13 at the bottom of reaction chamber 1 and under material supply port 12. The material accumulated in the unprocessed material reservoir 86 can be returned to material supply device 10 and reused, and the material utilization efficiency can be increased.

Finally, as illustrated in FIG. 1, fine particles 18 generated by arc discharge 16 are carried to fine particle collector 3 by the flow of the gas from discharge gas supply pipe 14 and the flow by the ascending airflow or the exhaust of the gas due to arc discharge 16. Although not shown, a cyclone capable of classifying fine particles having an optional particle size or larger and a bag filter capable of collecting desired fine particles may be attached to the fine particle collector 3, for example. In addition, when picking up the collected fine particles to the atmosphere, there is a risk of ignition, and thus it is preferable that the collected fine particles are left for several hours in an atmosphere containing about 1% of the atmosphere (oxygen-containing gas), are subjected to a gradual oxidation treatment, and then picked up to the atmosphere. As a result, the surface of the silicon fine particle has a surface oxide film of several nanometers, so that it can be picked up safely. Through these processes described above, it is possible to collect silicon fine particles of 10 nanometers to 300 nanometers from the bag filter.

In the first embodiment, a method of producing fine particles of silicon (Si) of nanometer order has been described, but the fine particles to be generated are not limited to silicon. For example, fine particles may be produced by using a carbon material such as fullerene or a nanotube, metal such as nickel (Ni), silver (Ag), copper (Cu), or iron (Fe), or an inorganic material such as glass ($SiO_2$), silicon nitride (SiN), silicon (SiC), alumina ($Al_2O_3$), or boron nitride (BN) as a material for forming fine particles. Further, by reacting with gas introduced into reaction chamber 1, fine particles of silicon monoxide (SiOx x=1 to 1.6), silicon nitride (SiNx:x=0.1 to 1.3) or silicon carbide (SiCx: x=0.1 to 1) may be produced. Further, it can be used for the production of a composite material composed of a plurality of materials having a silicon nucleus inside and covered with amorphous silicon oxide, alumina, silicon carbide or the like on the outside.

It can also be used for a spheroidizing process of the above-mentioned materials and other materials. When the supply rate of the material is increased or the particle size of material particle 17 is increased, the temperature of the surface of material particle 17 can be raised to a temperature higher than the melting point and cooled, so that spherical particles can be generated.

According to the first embodiment, with respect to a direction (direction from vertically downward to vertically upward, z direction) in which material particles 17 flow between the vicinity of material supply port 12 and collector 3, lower electrode arrangement region 81 on the material supply port and upper electrode arrangement region 82 separated from lower electrode arrangement region 81 to the collector side are provided in the central part of reaction chamber 1. Lower electrode arrangement region 81 and upper electrode arrangement region 82 intersect each other. In addition, the plurality of lower electrodes 4b are arranged in lower electrode arrangement region 81, and the plurality of upper electrodes 4a are arranged in upper electrode arrangement region 82 so as to form a multistage structure. Further, inverter 41 connected to lower electrodes 4b of first electrode arrangement region (lower electrode arrangement region) 81 on the material supply port side can apply electric power with a frequency of 50 Hz or 60 Hz or more, which is a commercial frequency. Particularly, it is desirable to set the frequency to be in a range of 50 Hz to 1000 Hz. A frequency which is equal to or lower than the frequency of first electrode arrangement region (lower electrode arrangement region) 81 can be applied by inverter 40 connected to upper electrodes 4a of second electrode arrangement region (upper electrode arrangement region) 82. With such a structure, it can be expected that the material processing efficiency can be increased and the material processing rate can be greatly improved in both lower electrode arrangement region 81 and upper electrode arrangement region 82.

Figure 5:
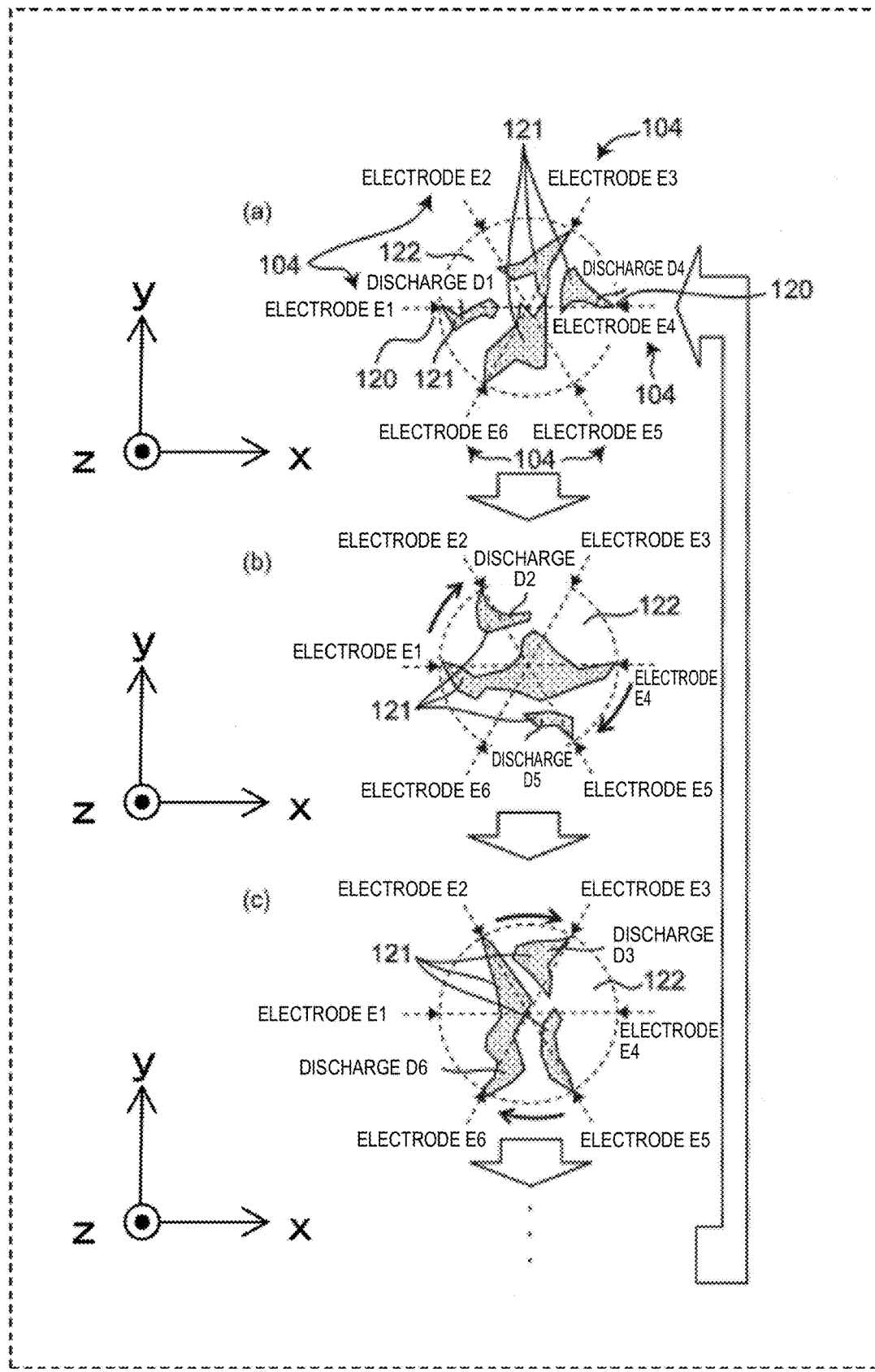
FIG. 5 shows sectional views (a) to (c) (x-y plane view), as viewed from the +z direction, of a portion which is surrounded by electrode in FIG. 4, and in which arc discharge is generated, and are schematic diagrams of a state of discharge of polyphase AC arc plasma at a certain moment.

The polyphase AC arc plasma used in the first embodiment is also the same as the polyphase AC arc plasma of Conventional Example 1 as illustrated in FIG. 5, and has a complicated discharge form, for example, a discharge form in which arc discharge region 121 which is discharged and non-discharged region 122 coexist in a time and a plane. In FIG. 5, for ease of understanding, discharged arc discharge region 121 is indicated as a hatched region and non-discharged region 122 is indicated as a region without being hatched. Due to this type of discharge, material particles 17 introduced into arc discharge 16 by lower electrodes 4b from material supply port 12 are repelled to the wall side of heat insulating member 2 due to the presence or absence of arc discharge region 121 or a complicated ascending airflow. That is, since the discharge of the polyphase AC arc plasma is complicated, the gas flow in the vicinity of the arc discharge region 121 due to the ascending air airflow or the like by arc discharge 116 is also complicated, and it is sometimes difficult to greatly improve the processing efficiency and the processing rate as assumed, merely by generating arc discharge 16 in the direction in which material particles 17 pass.

In this regard, in the first embodiment, it is important to control the drive frequency of the arc discharge in lower electrode arrangement region 81 and upper electrode arrangement region 82 in order to more reliably improve the processing efficiency and the processing rate.

In the first embodiment, the electric power having a frequency of 60 Hz or more, which is a commercial frequency, is applied to lower electrodes 4b of first electrode arrangement region 81, and a frequency equal to or lower than the frequency of first electrode arrangement region 81 is applied to upper electrode 4a of second electrode arrangement region 82. With such a configuration, in consideration of spreading of material particles 17 introduced from material supply port 12, by controlling the concentration region of the arc discharge in lower electrode arrangement region 81 and upper electrode arrangement region 82 and the spread of the arc discharge and the probability that the material particles 17 or the gas in which the material particles 17 have evaporated is introduced into the arc discharge increases and the evaporation efficiency of the material can be increased.

Note that, it is possible to achieve each of the effects by combining the above-described embodiments, optional embodiments among the Modified Examples, or Modification Examples as appropriate. In addition, combinations of the embodiments or combinations of the embodiments or combinations of the embodiments and the examples are possible and combinations of features in different embodiments or examples are also possible.

According to the fine particle producing apparatus and the fine particle producing method of the present disclosure, it is possible to increase the processing efficiency of the material particles and to process a large amount of fine particles at low cost. Therefore, the fine particle producing apparatus and the fine particle producing method according to the present disclosure are useful as a fine particle producing apparatus and a fine particle producing method used for devices requiring mass production such as lithium ion secondary batteries or ceramic condensers.

What is claimed is:

1. A fine particle producing apparatus comprising:
    a reaction chamber extending vertically from a lower side to an upper side;
    a material supply device which is connected to a central part on one end side of the vertically lower side inside the reaction chamber and supplies a material particle in the reaction chamber in the vertically upper side from a material supply port;
    a first electrode arrangement region which protrudes in an inward radial direction to be disposed on an inner peripheral wall in the reaction chamber which is vertically above the material supply device, and includes a plurality of lower electrodes to which AC power is applied;

a second electrode arrangement region which protrudes in the inward radial direction to be disposed on the inner peripheral wall in the reaction chamber which is vertically above the first electrode arrangement region, and includes a plurality of upper electrodes to which AC power is applied;

a collector which is connected to an other end side in the reaction chamber of the vertically upper side so as to collect fine particles;

a power source which is capable of changing a frequency of the AC power applied to at least one of the plurality of lower electrodes included in the first electrode arrangement region or the plurality of upper electrodes included in the second electrode arrangement region; and a controller which sets the frequency of the AC power applied to the plurality of lower electrodes as a frequency equal to or higher than the frequency of the AC power applied to the plurality of upper electrodes, wherein a fine particle is generated from the material particle by generating arc discharge by the lower electrode and the upper electrode, and generating plasma in the reaction chamber.

2. The fine particle producing apparatus of claim 1, wherein the plurality of lower electrodes and the plurality of upper electrodes are arranged such that a diameter of a circle formed by tip ends of the plurality of lower electrodes included in the first electrode arrangement region is equal to or smaller than a diameter of a circle formed by tip ends of the plurality of upper electrodes included in the second electrode arrangement region.

3. The fine particle producing apparatus of claim 1, wherein the plurality of lower electrodes included in the first electrode arrangement region and the plurality of upper electrodes included in the second electrode arrangement region are arranged so as not to overlap with each other when viewed in a direction in which the material particles flow to the vertically upper side from the vertically lower side.

4. The fine particle producing apparatus of claim 3, wherein the plurality of lower electrodes and the plurality of upper electrodes are arranged so as to be relatively shifted by 30° when viewed from the vertically upper side.

5. The fine particle producing apparatus of claim 1, wherein the plurality of upper electrodes is installed so that an angle with respect to a horizontal plane is smaller than an angle of the plurality of lower electrodes with respect to the horizontal plane when the plurality of lower electrodes and the plurality of upper electrodes are projected onto a plane including a direction in which the material particle flows to the vertically upper side from the vertically lower side.

* * * * *